United States Patent

[11] 3,600,007

[72] Inventor Charles O. Morris
5613 Layton Drive, North Highlands, Calif. 95660
[21] Appl. No. 878,139
[22] Filed Nov. 19, 1969
[45] Patented Aug. 17, 1971

[54] FIREHOSE CONNECTOR
7 Claims, 3 Drawing Figs.

[52] U.S. Cl.................................................. 285/35, 285/38, 285/322, 285/379
[51] Int. Cl........................................................ F16l 37/10
[50] Field of Search............................................ 285/34, 35, 38, 32 R, 322, 323, 276, 379

[56] References Cited
UNITED STATES PATENTS
| 964,578 | 7/1910 | Stephens | 285/276 |
|---|---|---|---|
| 1,111,991 | 9/1914 | Bremer | 285/35 |
| 2,327,714 | 8/1943 | Iftiger | 285/35 |
| 2,231,310 | 2/1941 | Williams | 339/202 |

FOREIGN PATENTS
| 1,208,967 | 9/1959 | France | 285/38 |
|---|---|---|---|
| 433,001 | 6/1911 | France | 285/34 |

Primary Examiner—Dave W. Arola
Attorney—Julian Caplan

ABSTRACT: A rapidly assembled and disassembled, pressure tight connection of a firehose to a hydrant or the like is made even if the threads of the outlet pipe of the latter are damaged or do not exist. A slotted, clamping sleeve receives a clamping nut on its external threads, and when the nut is tightened the slotted end of the clamping sleeve engages the outlet pipe. A hose connector carries an enlarged external diameter collar faced with a gasket which bears against the end of the outlet pipe and the gasket is forced thereagainst by a threaded body which engages internal threads on the clamping sleeve. The hose connector swivels inside the body until the collar is tightened against the end of the outlet pipe.

PATENTED AUG 17 1971

3,600,007

INVENTOR.
CHARLES O. MORRIS
BY
Julian Caplan
ATTORNEY

FIREHOSE CONNECTOR

This invention relates to a new and improved connector for connecting firehose to hydrants and for various types of pipe and plumbing connections. For convenience, the invention is described in its preferred use—connecting a standard firehose to a hydrant. As thus understood particularly, the invention relates to a means for attaching a firehose to a fire hydrant outlet or other source of fluid under pressure.

A particular advantage of the present invention is the fact that means is provided for attaching a hose to an outlet which may be externally threaded with substantially intact threads or may have damaged threads or may be smooth. The connection is adaptable to outlets of various sizes from one-half inch in diameter to any larger sized outlet.

A further feature and advantage of the invention is the fact that the connection will stand considerable pressure whether the outlet is threaded or unthreaded and whether the threads are in good condition or severely damaged. Thus the connector provides a fluid-type seal against the end of the connector and the external surface of the outlet is merely a means to which the connector is gripped. The device does not require a watertight threaded engagement between the connector and the exterior of the outlet.

Another feature of the invention is the fact that the device may be installed very rapidly, an advantage in firehose usage, and will also disconnect rapidly.

Another feature of the invention is the fact that the body or member to which the firehose is threaded is rotatable relative to the hydrant until a firm connection is made thereby allowing the hose to swivel relative to the hydrant while a connection is being made and thus eliminating the possibility of twisting or kinking hose. Nevertheless when the connector is secured, a rigid, pressure tight, locked connection results.

Other objects of the present invention will become apparent upon reading the following specification and referring to the accompanying drawings in which similar characters of reference represent corresponding parts in each of the several views. In the Drawings.

Figure 1:
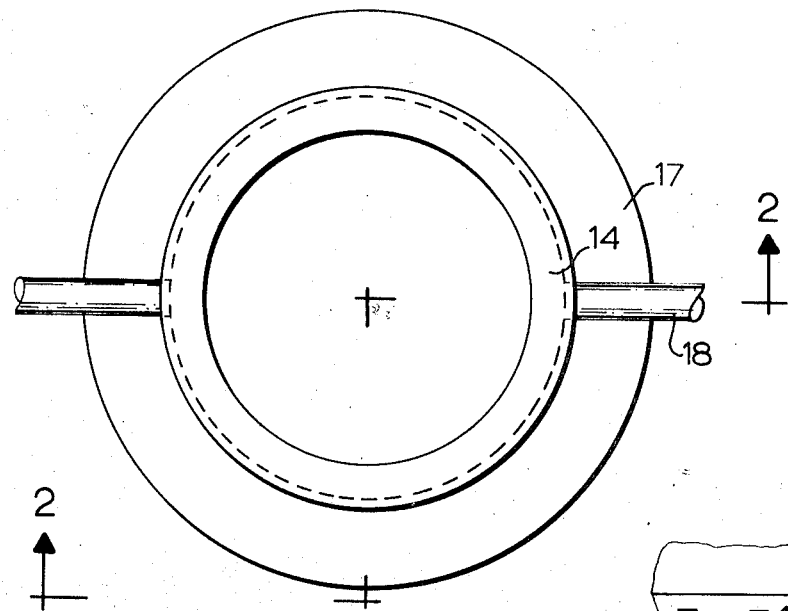
FIG. 1 is an end elevational view of the connector of the present invention partly broken away to conserve space.
Figure 3:
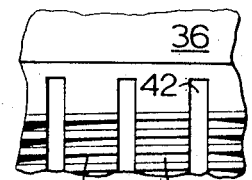
FIG. 3 is a fragmentary elevational view of the hub and fingers of the gripping member.

The present invention provides a series of interfitting sleeves hereinafter described in detail, which are concentric with the circular cross section outlet 11 of a fire hydrant or the like. Outlet 11 has a relatively smooth annular outer end 12 and external threads 13 are formed inwardly of end 12. The threads 13 of a fire hydrant tend with the passage of time to be damaged and this makes a pressure tight threaded connection difficult to achieve. Further, as the threads become damaged it becomes more and more difficult to install and remove a hose from the outlet. The present invention fits over the threaded end 13 but the engagement of the threads is not a crucial factor in the formation of the seal. Hence, even if the threads 13 are damaged or even if they are nonexistent, a proper connection may be achieved.

Body 14 is cylindrical and of the same inside diameter as outlet 11. The exterior 16 of body 14 is threaded and a conventional firehose ferrule may be attached thereto. Diametrically opposed hubs 17 are formed on member 14 to receive handles 18 by which the body 14 may be rotated relative to outlet 11. On the inner end of body 14 is a steel or other metal collar 21 held nonrotatable with respect thereto by screws 22 or other means. Interposed between collar 21 and end 12 is a rubber gasket 23. When the collar 21 is forced toward end 12 as hereinafter appears, the gasket 23 seals against end 12 and also against collar 21 which is in fluidtight relationship relative to body 14.

Sleeve 26 surrounds body 14 below hub 17. The outer ends of sleeve 26 have second hubs 27 which carry second handles 28 projecting radially therefrom. Sleeve 26 is freely rotatable relative to body 14 before the connector is tightened and to facilitate such free rotation, nylon or other friction reducing rings 29 and 31 and interposed between the rotatable members in insertable grooves. External threads 32 are formed on sleeve 26 below hubs 27.

Figure 2:
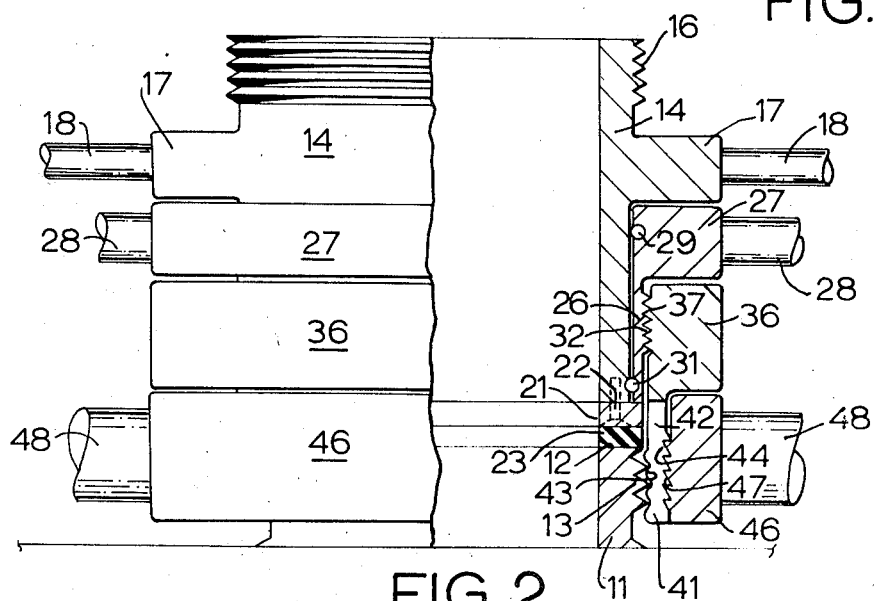
FIG. 2 is a view taken substantially along the line 2-2 of FIG. 1.

Slotted tubular gripping member or hub 36 has internal threads 37 which mesh with threads 32. The lower end of member 36 as viewed in FIG. 2, has a plurality of fingers 41 which are formed by slots 42 which extend inward from the lower end of hub 36 to approximately one-quarter inch from the face of hub 36. The interior of fingers 41 is threaded as indicated by reference numeral 43 to mesh in loose fashion with threads 13 and the exterior of fingers 41 is also threaded as indicated by reference numeral 44. Reference is made to Williams U.S. Pat. No. 2,231,310 issued Feb. 11, 1941 showing a clamp connector of the general type of member 36.

Surrounding the fingers 41 is nut 46 having internal threads 47 which mate with threads 44 of fingers 41. Handles 48 are formed on nut 46.

In the use of the device, prior to the installation of the connector on outlet 11, nut 46 is backed off relative to clamp member 36 so that the fingers 41 will slip over the threads 13 or can easily be threaded relative thereto. Thereupon nut 46 is turned by means of handles 48 so that the fingers 41 clamp against the outlet 11 and thereafter the member 36 cannot be moved axially relative to outlet 11. The nut 46 may be turned readily and rapidly to effect the connection. During the preliminary portion of the installation, sleeve 26 is loose relative to member 36. In other words, member 26 is moved inwardly relative to member 36 as viewed in FIG. 2. This relationship allows body 14 to swivel relative to sleeve 26 and hence the tightening of the connector on outlet 11 does not cause a turning of the hose which is in engagement with body 14. To complete the connection, handles 28 are rotated to force sleeve 26 towards outlet 11 and the end of sleeve 26 bears against collar 21 and forces that collar and gasket 23 into firm engagement with end 12. When gasket 23 is compressed between collar 21 and end 12, a pressure tight seal is effected between body 14 and outlet 11. Further, rotation of body 14 relative to sleeve 26 and end 11 is terminated. For disconnection, a reverse rotation of the parts is performed.

Although the foregoing invention has been described in some detail, by way of illustration and example for purposes of clarity of understanding, it is understood that certain changes and modifications may be practiced within the spirit of the invention and scope of the appended claims.

What I claim is:

1. A connector comprising a cylindrical body having a first end formed for attachment to a hose or other outlet and a second end opposite said first end, a seal on said second end having an external diameter larger than said second end, a sleeve surrounding said second end and rotatable relative thereto prior to completion of connection, said sleeve bearing against said seal and having external first threads, and means preventing said sleeve from being detached from said second end, an annular connector member having internal second threads mating with said first threads and having a plurality of axially projecting tapered fingers separated from each other by radial slots, said fingers surrounding said seal and projecting beyond said seal and being deformable in a radial direction relative to said connector member, said fingers formed with external third threads, and a nut surrounding said fingers and having internal threads in threaded engagement with said third threads, whereby upon rotation of said nut relative to said connector member said fingers are clamped against a tubular outlet disposed within said fingers and upon rotation of said sleeve relative to said connector member said seal is tightened against said outlet and said body is gripped against rotation relative to said connector member.

2. A connector according to claim 1 in which said seal includes a rigid collar of an external diameter greater than said second end.

3. A connector according to claim 2 in which said collar is fixed to said second end of said body and said seal comprises a resilient gasket on the side of said collar opposite said second end.

4. A connector according to claim 1 which further comprises separate turning means connected to said body, said sleeve and said nut for turning movement thereof relative to each other.

5. A connector according to claim 4 in which each said turning means comprises a radial handle.

6. A connector according to claim 1 which further comprises antifriction bearing means interposed between the exterior of said body and the interior of said sleeve.

7. A connector according to claim 1 in which the interior of said fingers are formed with fourth threads for gripping engagement with the exterior of said outlet.